US005913441A

United States Patent [19]

Voirol

[11] Patent Number: 5,913,441

[45] Date of Patent: Jun. 22, 1999

[54] FUEL TANK HAVING A BODY OF PLASTICS MATERIAL AND A SEALING GASKET

[75] Inventor: Bernard Voirol, Cormeilles En Parisis, France

[73] Assignee: Le Joint Francais SNC, Paris, France

[21] Appl. No.: 08/868,613

[22] Filed: Jun. 3, 1997

[30] Foreign Application Priority Data

| | | | |
|---|---|---|---|
| Jun. 4, 1996 | [FR] | France | 96 06860 |
| May 9, 1997 | [EP] | European Pat. Off. | 97401041 |

[51] Int. Cl.[6] ........ B65D 88/00; B65D 88/42

[52] U.S. Cl. ........ 220/60; 220/288; 220/304; 277/525; 285/349; 285/354

[58] Field of Search ........ 220/601, 304, 220/288; 285/349, 354, 202, 204, 205, 206, 348, 220, 221; 277/519, 521, 525

[56] References Cited

U.S. PATENT DOCUMENTS

| | | | |
|---|---|---|---|
| 503,443 | 8/1893 | McIntyre | 285/357 |
| 1,674,188 | 6/1928 | Behnke | 220/304 |
| 2,651,528 | 9/1953 | Robinson | 220/304 X |
| 3,074,747 | 1/1963 | Boughton | 285/348 X |
| 3,188,122 | 6/1965 | Smith | 285/348 X |
| 3,203,576 | 8/1965 | Wout et al. | 220/304 |
| 3,259,406 | 7/1966 | Kish | 285/348 X |
| 3,322,432 | 5/1967 | Soguel . | |
| 5,330,068 | 7/1994 | Duhaime et al. | 220/304 |

FOREIGN PATENT DOCUMENTS

| | | | |
|---|---|---|---|
| 379401 | 7/1990 | European Pat. Off. . | |
| 2596333 | 10/1987 | France . | |
| 685638 | 12/1939 | Germany | 220/304 |
| 1146768 | 3/1969 | United Kingdom . | |

*Primary Examiner*—Allan N. Shoap
*Assistant Examiner*—Joe Merek
*Attorney, Agent, or Firm*—Alston & Bird LLP

[57] ABSTRACT

The invention relates to a fuel tank presenting a tank body having a neck about an axis, the neck being extended by a region of section smaller than that of the neck, a plate, and a nut screwed onto the neck of the tank, an annular housing for a gasket being defined by a top edge of the neck, a bottom edge of the plate, an outer cylindrical plate of the annular region, and an inner cylindrical face of the nut, the gasket having a top edge, a bottom edge, an outer edge, and an inner edge, and the tank being made of plastics material. In section, the gasket has a profile that is elongate parallel to said axis.

14 Claims, 2 Drawing Sheets

45 15 25 24 23 28 16 10 9 43 48 40 8 41 47 17 42 16 7 5 20 12 21 44 4 6 22 3 11 2

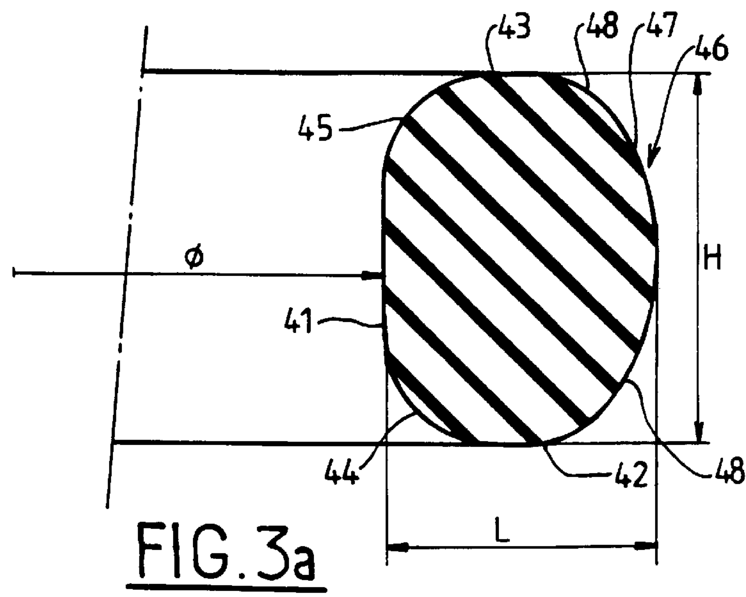
FIG. 3a
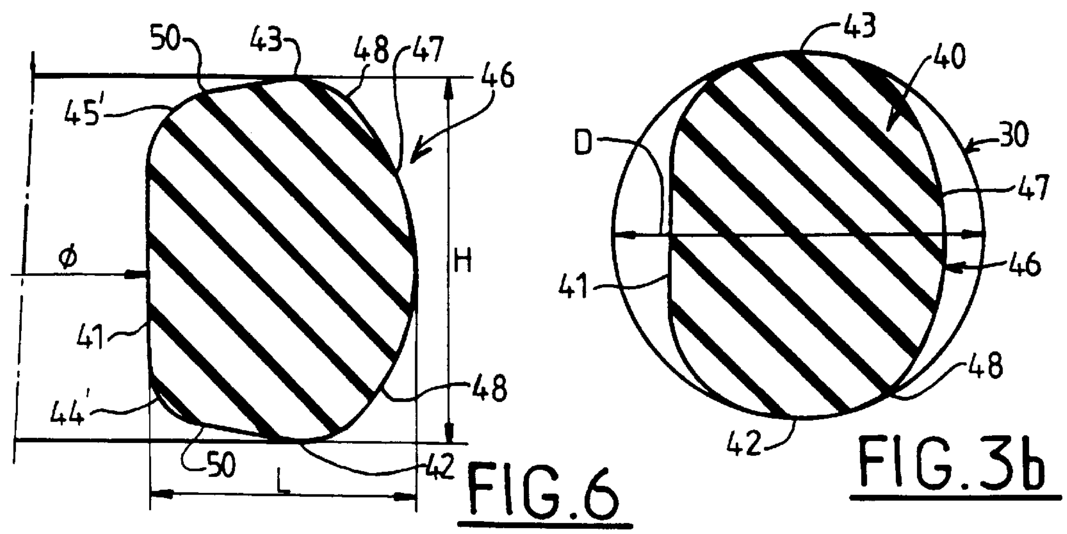
FIG. 6
FIG. 3b
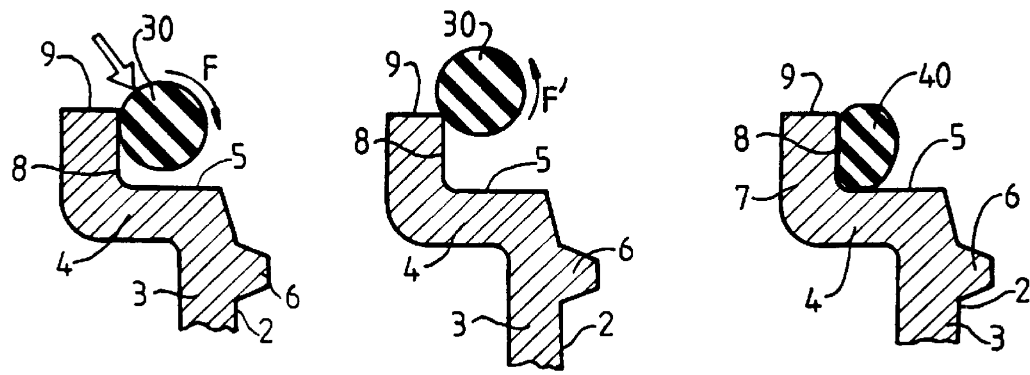
FIG. 4a
FIG. 4b
FIG. 5

FUEL TANK HAVING A BODY OF PLASTICS MATERIAL AND A SEALING GASKET

The present invention relates to a fuel tank presenting a tank body having a neck about an axis, the neck being extended by a region of section smaller than that of the neck, a plate, and a nut screwed onto the neck of the tank, an annular housing for a gasket being defined by a top edge of the neck, a bottom edge of the plate, an outer cylindrical face of the annular region, and an inner cylindrical face of the nut, the gasket having a top edge, a bottom edge, an outer edge, and an inner edge, and the tank being made of plastics material.

BACKGROUND OF THE INVENTION

In the context of improving the sealing of vehicles, new standards are being prepared, under the name EURO 2000, and they are going to lead to modifications and improvements of sealing.

For fuel tanks, several manufacturers have been directing their attention to O-rings for use as plug gaskets.

However, the use of such gaskets leads to two types of problems, in particular with tanks having a tank body made of a plastics material, e.g. polyethylene:

a) the tolerances on parts made of plastics material lead to gaskets having a diameter of at least about 5 mm, and this gives rise to the problem of bulk for housing the gasket, and to a problem of the neck of the tank being deformed; and b) there is exists the problem of holding the gasket against the rim of the tank prior to putting the plug into place.

Certain vehicles are fitted with plug gaskets that have lips which perform a function of taking up clearance at the price of greater complication with respect to the profile of the gasket, and in particular with respect to molding it.

OBJECT AND SUMMARY OF THE INVENTION

The present invention seeks to provide a tank that solves at least above-mentioned problem a). The invention thus provides a fuel tank presenting a tank body having a neck about an axis, the neck being extended by a region of section smaller than that of the neck, a plate, and a nut screwed onto the neck of the tank, an annular housing for a gasket being defined by a top edge of the neck, a bottom edge of the plate, an outer cylindrical face of the annular region, and an inner cylindrical face of the nut, the gasket having a top edge, a bottom edge, an outer edge, and an inner edge, and the tank being made of plastics material, wherein the gasket has, in section, a profile that is elongate parallel to said axis.

Implementing such a gasket also makes it possible to save on material compared with an O-ring, thereby reducing cost.

Problem b) can also be avoided by the fact that the gasket has a cylindrical face which bears against the outer cylindrical face of the annular region.

It is particularly advantageous for the profile of the gasket to be inscribed inside the profile of a torodial O-ring of diameter corresponding to the housing.

The face of the gasket facing towards the inside cylindrical face of the nut is advantageously convex. At least over a major portion of the distance between the bottom edge of the plate and the top edge of the neck, the gasket may present a width measured perpendicularly to said axis suitable for reducing its permeability to vapors from the fuels that the tank is designed to contain.

The invention also relates to the use of a gasket in a fuel tank having a tank body of plastics material with a neck that is extended by an annular region of smaller annular section than the neck, a plate, and a nut screwed on the neck, a housing for a gasket being defined by a top edge of the neck, a bottom edge of the plate, an outer cylindrical face of the annular region, and an inner cylindrical face of the nut, which gasket has, in section, a profile that is elongate parallel to said axis. The gasket may present at least one cylindrical face and/or plane annular faces. Preferably, the face of the gasket which faces the inner cylindrical face of the nut is convex.

BRIEF DESCRIPTION OF THE DRAWINGS

Other characteristics and advantages of the invention appear better on reading the following description given as a non-limiting example, and with reference to the accompanying drawings, in which:

FIG. 3*a* is a section view through a gasket of the invention;

FIG. 3*b* superposes the profile of an O-ring of nominal diameter corresponding to a housing of the tank, on a gasket of the invention corresponding to the same housing;

FIGS. 4*a* and 4*b* show the problem of an O-ring rolling, while FIG. 5 shows the behavior of a particularly advantageous embodiment of a gasket of the invention; and FIG. 6 is a section through a preferred variant of the gasket shown in FIG. 3*a*.

MORE DETAILED DESCRIPTION

Figure 1:
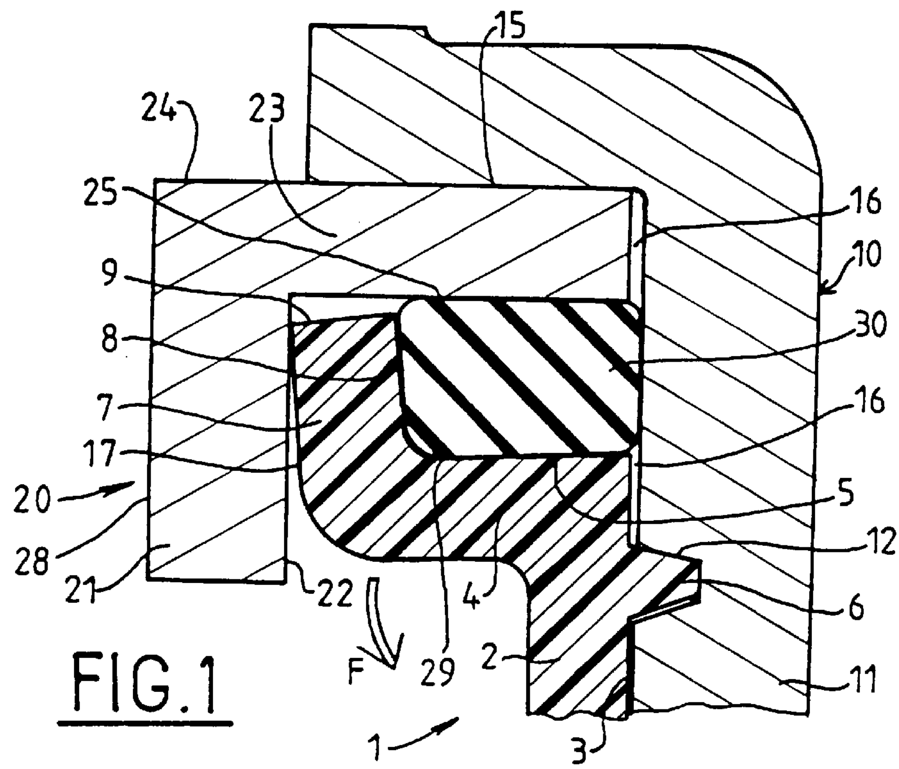
FIG. 1 shows a tank having a toroidal plug gasket, in a housing with minimum tolerance.
Figure 2:
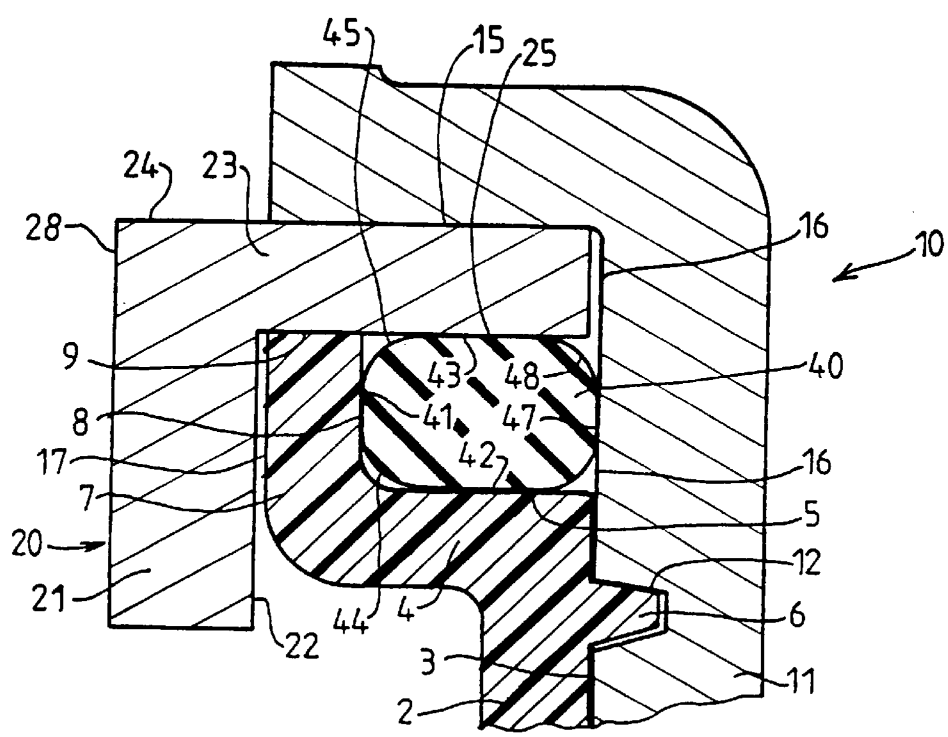
FIG. 2 shows a tank having a plug gasket of the invention, in a housing with minimum tolerance.

As shown in FIGS. 1 and 2, a plastics material tank, given overall reference 1, e.g. a polyethylene tank, has a generally cylindrical neck 2 with an outer cylindrical surface 3 provided with a thread 6 onto which a nut 10 is screwed that is provided on its own inside cylindrical face 16 with tapping complementary to the thread 6.

The neck 2 has an inner edge 4 that has a plane annular top face 5. A cylindrical region 7 adjacent to the face 5 extends the inside edge 4 upwards. The section of the region 7 is smaller than that of the neck 2. It presents a top edge 9 and an outer cylindrical face 8 which are adjacent to the plane face 5 and to an internal cylindrical face 17. A plate 20 has an L-shaped profile in section with two branches: a branch 23 with an annular top face 24 and an annular bottom face 25; and a branch 21 disposed perpendicularly to the branch 23 and having an outer cylindrical face 22 and an inner cylindrical face 28.

The plate 20 is locked in place by a nut 10 which has a face 15 pressing against the face 23 of the plate 20 so that the face 25 bears against the top edge 9 of the region 7. The annular faces 5 and 25 and the cylindrical faces 8 and 16 define a housing for a gasket.

The dimensions of a gasket need to be selected so that its compression ratio lies in the range 5% to 25% depending on whether the housing is at maximum or at minimum tolerance.

Given the dispersion of dimensions due to the materials used in the intended application (fuel tanks), the volume of the housing or groove tends to be too small. The dispersion of dimensions implies using a toroidal O-ring 30 of diameter that is not less than 5 mm (to comply with the above-mentioned condition relating to compression ratio) and which has a top bearing edge, a bottom bearing edge, an outer bearing edge, and an inner bearing edge, said edges being of point-sized section prior to the O-ring being compressed, but spreading out when it is compressed as shown in FIGS. 1 and 2. When the tolerances have their minimum values, the O-ring 30 occupies the entire surface area of the housing and tends to deform the region 7 (FIG. 1) as indicated by arrow F. The region 7 is then no longer parallel to the axis of the neck 2, and the edge 9 is moved away from the face 25. This is harmful to the mechanical strength and to the sealing of the device. In addition, assembly and disassembly are made difficult.

By using a gasket 40 according to the present invention whose profile is elongate parallel to the axis of the neck 2, it is possible to remedy this drawback at least to a large extent, as shown in FIG. 2.

The gasket 40, a particularly advantageous embodiment thereof being shown in FIG. 3*a* is elongate, wherein it has a height H taken parallel to the axis of the neck 2, and a maximum width L taken perpendicularly to said axis, such that H>L.

It has an inner cylindrical face 41 in contact with the face 8, two plane faces, a bottom plane face 42 in contact with the face 5 and a top plane face 43 in contact with the face 25, and a convex region 46 with a central portion 47 and running into the faces 42 and 43 via regions 48. The faces 41 and 42 are connected together by a convex region 44, and the faces 41 and 43 are connected together by a convex region 45.

The presence of a flat cylindrical face 41 serves to avoid the phenomenon whereby the gasket 40 rolls and escapes. This phenomenon is shown in FIGS. 4*a* and 4*b* for a toroidal O-ring 30. If the O-ring 30 is mounted without being stretched sufficiently for remaining in the groove, it tends to roll in the direction of arrow F while it is being put into place. As a result, it tends to return to its initial position under the effect of its own elasticity by rolling in the opposite direction as shown by arrow F' (FIG. 4*b*). However, with a gasket 40 of elongate shape (H>L), presenting a cylindrical face 41, the rolling phenomenon is avoided, the gasket 40 being put into place by being stretched around the face 8.

By using a gasket 40 it is also possible to reduce the volume of rubber that is used, which rubber is generally a fluorocarbon, which is an expensive material that is compatible with fuels.

The width L (L<H) and the shape of the convex region 46 are selected so as to avoid fuel vapor passing through the gasket 40 by permeability.

The profile of the gasket 40 is preferably such that it can be inscribed inside the profile of the toroidal O-ring 30, i.e. H=D and L<D.

Example for the outer cylindrical face 8 having a diameter of 126 mm:

a) O-ring 30: inside diameter Ø=15 mm (poor holding)
D=5 mm b) Gasket 40: Ø=123 mm (better holding)
H=5 mm
L=4 mm FIG. 6 shows a variant of the gasket shown in FIG. 3*a,* of a shape that enables the axial pressure of the gasket on its inside diameter to be reduced, thereby making it possible to reduce the residual deformation of the neck of the tank by reducing the stress applied by the gasket 40 on the neck of the tank, particularly in the region 28 situated in the vicinity of the inside diameter of the housing for the gasket (see FIG. 1). This result is obtained with the help of at least one region 50 of flattened shape that is preferably completely flat, interconnecting the faces 41 and 42 and also the faces 41 and 43, optionally via convex regions 44' and 45', and reducing the height of the gasket on getting closer to the inside face 41 thereof.

I claim:

1. A fuel tank presenting a tank body having a neck about an axis, the neck being extended by an annular region of section smaller than that of the neck, a plate having a bottom surface, and a nut screwed onto the neck of the tank, the nut comprising an internally threaded sleeve and an annular, radially inwardly extending flange from the top of said sleeve, an annular housing for a gasket being defined by a top edge of the neck, a bottom edge of the plate, an outer cylindrical face of the annular region, and an inner cylindrical face of the nut, the gasket having a top edge, a bottom edge, an outer edge, and an inner edge, a surface of the flange of the nut cooperating with a surface of the plate to apply a bottom surface of the plate on the top edge of the gasket to compress the gasket in the direction of said axis, said bottom surface extending over said annular region, the gasket in its entirely being contained radially outwardly of said annular region, and the tank being made of plastic material, wherein the gasket in its undeformed state has, in section, a profile that is elongate parallel to said axis.

2. A tank according to claim 1, wherein the inner edge of the gasket has a cylindrical face while the gasket is in the undeformed state, and the inner edge of the gasket bears against the outer cylindrical face of the annular region.

3. A tank according to claim 1, wherein the profile of the gasket is inscribed inside the profile of a torodial O-ring whose diameter corresponds to the housing.

4. A tank according to claim 1, wherein the top edge of the gasket has a plane annular top face bearing against the bottom edge of the plate.

5. A tank according to claim 1, wherein the bottom edge of the gasket has a plane annular bottom face bearing against the top edge of the neck.

6. A tank according to claim 1, wherein the outer edge of the gasket which faces towards the inner cylindrical face of the nut is convex.

7. A tank according to claim 1, wherein the gasket presents, at least over a major portion of the distance between the bottom edge of the plate and the top edge of the neck, a width measured perpendicularly to said axis that serves to prevent the gasket being permeable to vapors of the fuels that the tank is designed to contain.

8. A tank according to claim 1, wherein the gasket has at least one inclined flattened region connecting the bottom edge of the gasket to the inner edge of the gasket.

9. A tank according to claim 1, wherein the gasket has at least one inclined flattened region connecting the top edge of the gasket to the inner edge of the gasket.

10. In combination, a gasket, a fuel tank having a tank body of plastic material with a neck about an axis and extended by an annular region of smaller annular section than the neck, a plate having a bottom surface, and a nut screwed on the neck, the nut comprising an internally threaded sleeve and an annular, radially inwardly extending flange from the top of said sleeve, an annular void in receipt of the gasket being defined by a top edge of the neck, a bottom edge of the plate, an outer cylindrical face of the annular region, and an inner cylindrical face of the nut, wherein a surface of the flange of the nut cooperates with a surface of the plate to apply a bottom surface of the plate on a top edge of the gasket to compress the gasket in the direction of said axis, said bottom surface extending over said annular region, the gasket in its entirety being contained radially outwardly of said annular region, and the gasket in its undeformed state has, in section, a profile that is elongate parallel to said axis.

11. The combination according to claim 10, wherein the gasket presents at least one cylindrical face.

12. The combination according to claim 11, wherein the face of the gasket which faces the inner cylindrical face of the nut is convex.

13. The combination according to claim 10, wherein the gasket presents plane annular faces.

14. The combination according to claim 13, wherein the face of the gasket which faces the inner cylindrical face of the nut is convex.

* * * * *